United States Patent
Nakagawa et al.

(10) Patent No.: US 7,430,612 B2
(45) Date of Patent: Sep. 30, 2008

(54) COMPUTING APPARATUS, COMPUTING PROGRAM, AND COMPUTING METHOD

(75) Inventors: Ikuo Nakagawa, Takaoka (JP); Kenichi Nagami, Ichikawa (JP)

(73) Assignee: Intec Netcore, Inc., Koto-ku (JP)

( * ) Notice: Subject to any disclaimer, the term of this patent is extended or adjusted under 35 U.S.C. 154(b) by 376 days.

(21) Appl. No.: 10/737,130

(22) Filed: Dec. 15, 2003

(65) Prior Publication Data

US 2004/0139438 A1    Jul. 15, 2004

(30) Foreign Application Priority Data

Dec. 18, 2002    (JP) .............................. 2002-366337

(51) Int. Cl.
*H04L 12/28* (2006.01)
*H04L 12/66* (2006.01)

(52) U.S. Cl. .................................... 709/242

(58) Field of Classification Search ................ 719/331, 719/332; 709/242
See application file for complete search history.

(56) References Cited

U.S. PATENT DOCUMENTS

| 5,815,707 A * | 9/1998 | Krause et al. ................ 719/321 |
| 6,154,878 A * | 11/2000 | Saboff ......................... 717/173 |
| 7,209,449 B2 * | 4/2007 | Tang et al. ................... 370/238 |
| 2003/0074487 A1 * | 4/2003 | Akgul et al. ................ 709/328 |

FOREIGN PATENT DOCUMENTS

| JP | 06-004477 | 1/1994 |
| JP | 06-222916 | 8/1994 |
| JP | 06-332675 | 12/1994 |
| JP | 7-099674 | 4/1995 |
| JP | 7-104992 | 4/1995 |
| JP | 7-152541 | 6/1995 |
| JP | 07-152551 | 6/1995 |
| JP | 8-307445 | 11/1996 |
| JP | 10-260826 | 9/1998 |
| JP | 11-312108 | 11/1999 |
| JP | 2000-35882 | 2/2000 |
| JP | 2000-089947 | 3/2000 |
| JP | 2000-137605 | 5/2000 |

OTHER PUBLICATIONS

Segal et al., "On-the-fly Program Modification: Systems for Dynamic Updating", IEEE Software, vol. 10, iss. 2, Mar. 1993, pp. 53-65.*

* cited by examiner

*Primary Examiner*—William M Treat
(74) *Attorney, Agent, or Firm*—Day Pitney LLP

(57) ABSTRACT

A computing apparatus capable of changing, adding, and deleting function without halting. Computing apparatus (100) includes a pointer storage section (101) storing the pointer specifying the execution section executing computation, a pointer management section (102) changing the pointer stored by the pointer storage section, a data storage section (103) storing the data used for execution of the execution section, and a execution instruction section (104) causing the execution section, specified by the pointer stored by the pointer storage section (101), to executed computation by using the data stored by the data storage section (103). According to this computing apparatus, the pointer management section (102) changes the pointer concurrent with re-reading, adding, or deleting of the execution section, thereby dynamically enabling change, addition, or deletion of function.

12 Claims, 23 Drawing Sheets

Fig 4

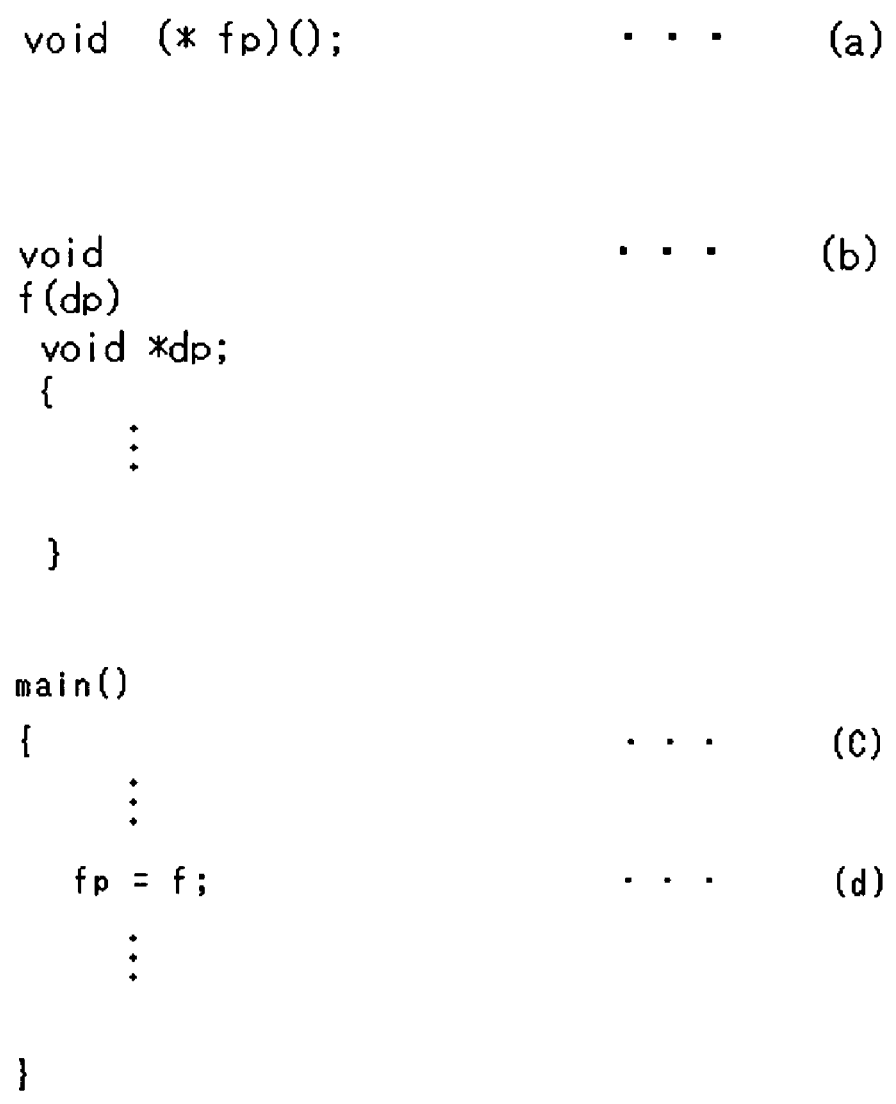

```
void  (* fp)();              ···    (a)

void                         ···    (b)
f(dp)
 void *dp;
 {
    ⋮

} main()
{                            ···    (c)
    ⋮ fp = f;                  ···    (d)
    ⋮

```
struct  pointerlist {
    void  (*fp)();                  ...  (a)
    struct  pointerlist  *next; ···  (b)
} *pointerlistbase;
```

Fig 9

```
void *p ;                        ... (a)
        ♦
        ♦
        ♦
P = (void*) 0×37468AB8;          ... (b)
        ♦
        ♦
        ♦
(*fp)(p);                        ... (c)
```

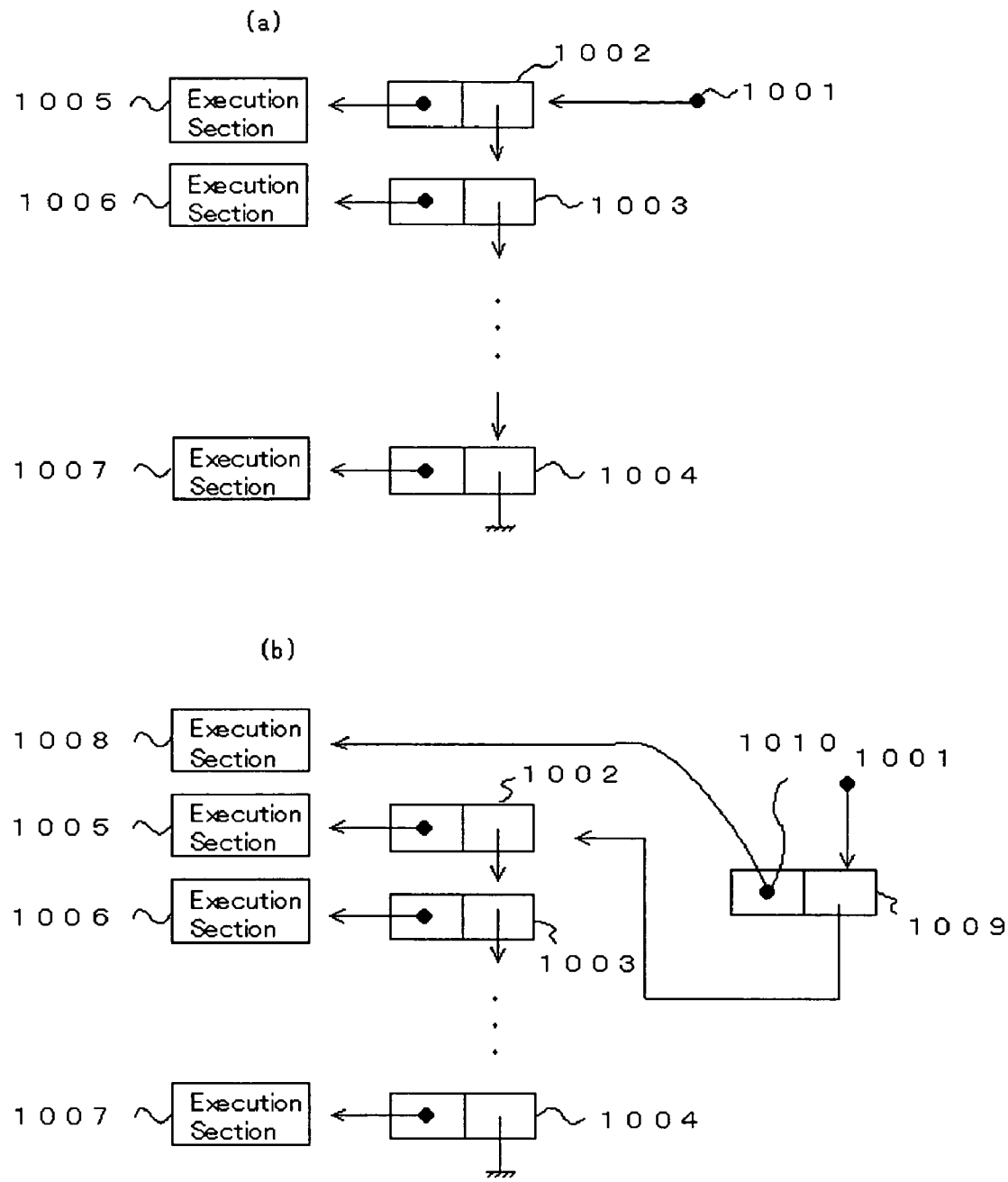

Fig. 1 1

```
struct    pointerlist    *pl;                · · ·  (a)

pl = malloc (sizeof  *pl);                   · · ·  (b)

pl —>   fp  =  g;                          ⎫
                                           ⎪
pl —>   next = pointerlistbase;            ⎬  (c)
                                           ⎪
pointerlistbase = pl ;                     ⎭
```

Fig. 1 2

```
struct   pointerlist  *pl;                          · · ·    (a)

pl  =  pointerlistbase;                                    ⎫
                                                           ⎬ (b)
pointerlistbase  =  pointerlistbase  —>  next;             ⎭ free (pl);                                          · · ·    (c)
```

Fig 1 3

```
struct    pointerlist    *pl;        ⎫
int                      n;          ⎬   ・・・(a)
void                     *p;         ⎭

P = (void*) 0 × 37468AB8;                ・・・(b)

pl = pointerlistbase;                    ・・・(c)
for ( n = 0; n < 3; n++)             ⎫
    pl = pl —> next;                 ⎬   ・・(d)

( *pl —> fp)(p);                         ・・・(e)
```

(a)

(b)

```
struct {
    enum    eventType    et;
    void              (*fp)();
    void                 *dp;
};
```

Fig. 21

```
struct   pointerlist   *pl;        ⎫
void    (*ep)();                   ⎬   ··· (a)
                                   ⎭ ep  =  (void (*)()) 0x284729EC;    ··· (b)
pl  =  pointerlistbase;            ⎫
while ( pl ! = NULL ) {            ⎬   ··· (c)
    if ( pl —> fp == ep)           ⎫
        break;                     ⎬   ··· (d)
    pl = pl —> next;               ··· (e)
}
```

PRIOR ART

PRIOR ART

COMPUTING APPARATUS, COMPUTING PROGRAM, AND COMPUTING METHOD

BACKGROUND OF THE INVENTION

1. Field of the Invention

The present invention relates to a computing apparatus, computing program and computing means. Specifically, it relates to computing by an execution section for executing computation, which is specified by a pointer.

2. Description of the Related Art

Conventionally, an undefined function, undefined procedure, or undefined variable can not exist in cases in a program executed in computer. For example, it is necessary to define all the functions, procedures, and variables to which the program refers in order to acquire an executable object by compiling a program expressed by a high-class programming language.

Here, "it is necessary to define all the functions, procedures, and variables to which the program refers" corresponds to the functions and procedure, to which the executable object refers, that exist in the code (instruction) segment, and values stored by variables, to which the executable object refers, that exist in data. The "code (instruction)" and "data" will be described hereinafter.

FIG. 23 is a view showing a frame format of the address space 2300 used at the point of executing a program by the computer. In cases where the upper segment of the address space 2300 corresponds to small addresses and the lower segment of the address thereof corresponds to large addresses, code (instruction) and data are stored in the small address area. Heap area is subsequent to that area. Stack area extends from the large address area.

The code (instruction) includes instructions for the computer to execute functions and procedures. The functions and procedures, to which the instruction included in the code refers, shall be placed in the address space. Moreover, data stores a value of a global variable defined by programming language. The heap is a memory area dynamically set aside in accordance with an execution of a program. When the memory is dynamically set aside by the function "malloc" etc, the one end of the heap extends to the greater address as indicated by arrow 2301. The stack is a memory area for storing return addresses to be stored at the point of calling functions and procedures and for storing local variables. When functions and procedures are called, the stack extends to the smaller address as indicated by arrow 2302.

However, in recent years, techniques using a shared library have become available, so that it has become unnecessary for functions, procedures and variables defined in the shared library to be defined at the point of compiling in order to acquire an executable object (refer to the official bulletin on Japan Patent Laid Open No. H06-332675). Therefore, the shared library, including definitions of undefined function, undefined procedure, and undefined variable, is to exist only when the executable object is executed. Therefore, undefined function included in the executable object is dynamically linked to the shared library at the start of execution, so that address thereof is resolved.

By using the shared library, for example, it becomes unnecessary to recompile in order to reflect a bug fix of function(s) in the library, and it becomes possible to downsize an executable object.

Note that functions provided by the shared library, instructions for executing process, and values of variables provided by the shared library are placed in the memory space between the heap and the stack. Specifically, the memory space is shared with the other processes in general.

However, even if the shared library is used, it is impossible to replace definitions of functions and procedures with the other definitions thereof during execution of the executable object. Therefore, for example, in cases where bugs are found, it is required to stop executing the executable object, to replace the executable object with a new executable object or the shared library with a new shared library, and to restart the program.

Therefore, since service by computer is indispensable at the present time, it is a problem that service provided by the executable object or the shared library may have to be suspended while replacing them.

This suspension of service causes a problem, for example, in the case of a web server that offers 24-hour service.

Moreover, this suspension of service causes a problem specifically in the router used for communications, such as the internet.

FIG. 22 shows a state wherein site-A and site-B are communicable by the router 2203, 2204, 2205, and 2206. In this case, it is necessary for each router 2203, 2204, 2205, and 2206 to have the route information from each of them to site-A so as to transmit data from site-B to site-A as indicated by a solid line. Thereby the router information flows as indicated by a dotted line. Similarly, it is necessary for the route information to flow as indicated by a dashed line so as to transmit data from site-A to site-B. Therefore, the router exchanges the route information with the co-adjacent router.

Thus, in cases where the router is halted in order to replace the executable object, sometimes called "firmware", operated in the router used for communication, the communication via the router is temporarily disrupted. As described hereinabove, the route information is exchanged between the routers and by this exchange, the router computes the information regarding the shortest path etc. and stores the result thereof. However, in cases where the router is halted, the stored information is deleted. Therefore, it is required to compute and store the information again after restart, so that recovery to the pre-halt condition is time-consuming.

According to the algorithm currently used, computation of the shortest path by router requires computational complexity of the following formula wherein N indicates number of routers and L indicates number of communication paths.

$$N \times (N+L) \qquad \text{Formula 1}$$

Specifically, since the order becomes proportional to the square of N, a lot of computational complexity is required for recovery at the present time wherein routers are widely used; therefore, a lot of time is required.

Moreover, the problem in version upgrades of firmware of this router becomes serious, specifically for the internet service provider. It is not uncommon that one internet service provider (ISP) possesses thousands of routers. For example, in cases where one internet service provider possesses 5,000 routers and version upgrades of firmware of routers are executed 3 times per year, the version upgrades of firmware are required to be executed 15,000 times per year. Therefore, on the average, about 50 routers per day are halted and version upgrades thereof are executed, thus amplifying the problem.

SUMMARY OF THE INVENTION

It is an object of the present invention to provide a computing apparatus, computing program and computing means capable of replacing functions and procedures without halting execution of the program in order to resolve the above deficiencies.

Firstly, the present invention provides the computing apparatus storing pointer specifying the execution section executing computation, changing the pointer in accordance with a predetermined condition, being capable of storing the data used for execution even if the pointer is changed, and causing the execution section specified by the pointer to execute computations according to the stored data.

Thereby it becomes possible to change the execution section by changing the pointer, and to provide continuous service because the data is still stored even if the pointer is changed.

Secondly, the present invention provides the computing apparatus adding and deleting pointer.

Thereby it becomes possible to cause the execution section, which has not executed, to execute and to cause the execution section, which has existed, not to execute.

Thirdly, the present invention provides the computing apparatus re-reading execution section and specifying re-read execution section by the pointer.

Thereby it becomes possible, for example, to cause the execution section fixed bug thereof to execute instead of the execution section having a bug.

Fourthly, the present invention provides the computing apparatus adding the execution section and specifying the added execution section by the pointer.

Thereby it becomes possible to add new function without suspending service provision.

Fifthly, the present invention provides the computing apparatus deleting execution section and deleting or changing the pointer specifying the deleted execution section.

Thereby it becomes possible to delete the execution section that is unnecessary or unavailable due to a bug.

Moreover, the present invention provides a computing program in order to implement the above-described computing apparatus by computer, and the computing means used by the computing apparatus and the computing program.

BRIEF DESCRIPTION OF THE DRAWINGS

FIG. 4 is an illustration of the execution section and the pointer of the present invention expressed by programming language.

FIG. 8 is an illustration of the list cell of the present invention, constructing the list structure, expressed by programming language.

FIG. 9 is an illustration of the execution instruction section of the present invention expressed by programming language.

FIG. 10 is an illustration of adding pointers to the list structure of the present invention.

FIG. 11 is an illustration of an operation of adding pointers expressed by programming language.

FIG. 12 is an illustration of an operation of deleting pointers expressed by programming language.

FIG. 13 is an illustration of an operation of searching for a specific pointer expressed by programming language.

FIG. 15 is an illustration of data structure corresponding events to pointer and data.

FIG. 18 is a flow chart of the process of adding the execution section.

FIG. 20 is a flow chart of the deletion process of the execution section.

FIG. 21 is an illustration of an operation of searching the execution section to be deleted expressed by programming language.

FIG. 22 is an illustration of the network being constructed by the router.

FIG. 23 is an illustration of a mode of a use of the address space.

DETAILED DESCRIPTION OF THE PREFERRED EMBODIMENTS

Hereinafter, the embodiments of the present invention will be described with the use of drawings. The present invention shall not be limited to the embodiments to be described, and may be embodied in various forms without departing from the essential characteristics thereof.

In the first embodiment of the present invention, the computing apparatus, computing program, and computing means store pointer(s) specifying the execution section for executing computation, changes the pointer in accordance with a predetermined condition, are capable of storing the data used for execution even if the pointer is changed, and cause execution section specified by the pointer to execute computation according to the stored data.

Figure 1:
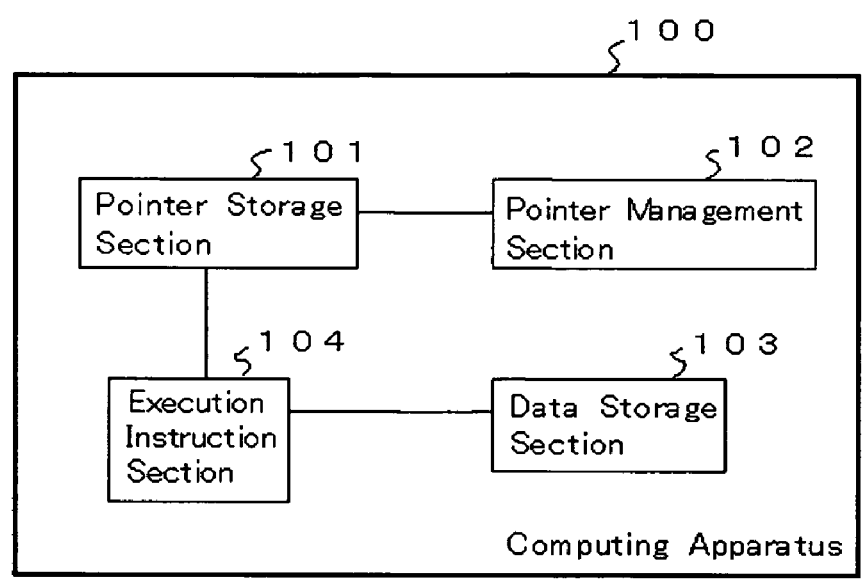
FIG. 1 is a functional block diagram of the computing apparatus of the present invention.

FIG. 1 is a functional block diagram of the computing apparatus of the first embodiment. The computing apparatus 100 comprises the pointer storage section 101, the pointer management section 102, the data storage section 103, and the execution instruction section 104.

The "pointer storage section" 101 stores the pointer for specifying the execution section. The "execution section" corresponds to the section for executing computation.

Figure 2:
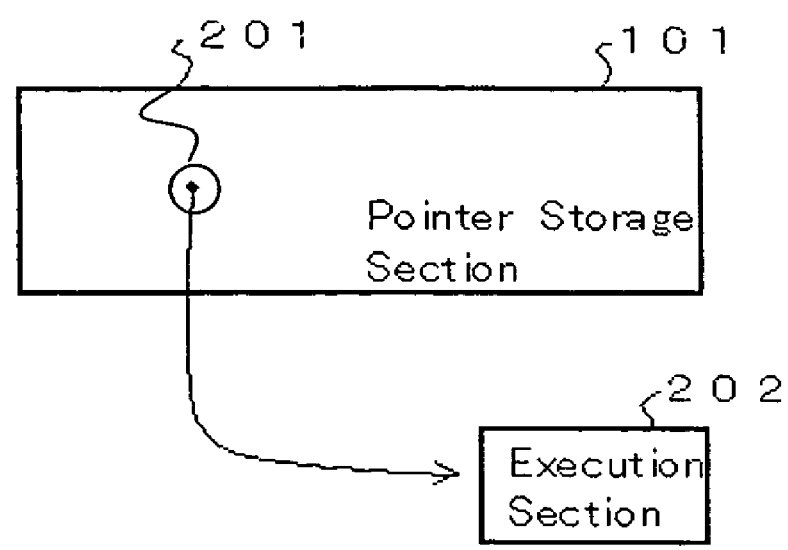
FIG. 2 is an illustration of a relationship between the pointer memory section and the execution section of the present invention.

FIG. 2 is an illustration of the relationship between the pointer storage section and the execution section. The pointer 201 exists in the pointer storage section 101 and specifies the execution section 202.

Figure 3:
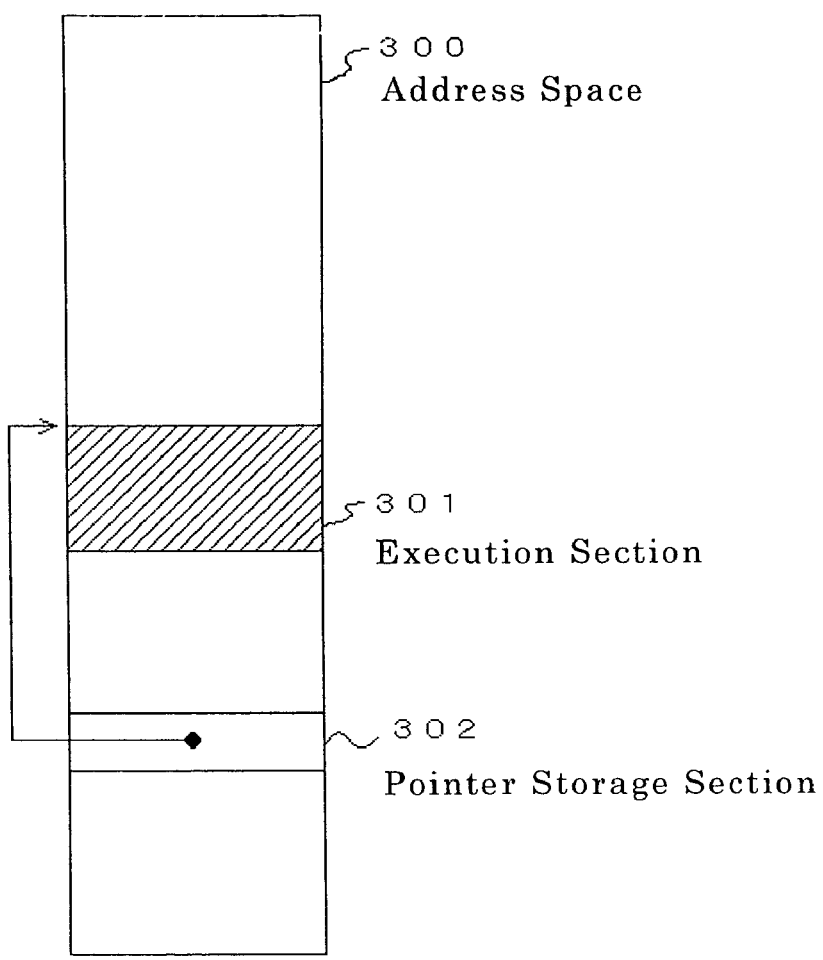
FIG. 3 is an illustration of the address space, the execution section, and the pointer placed therein of the present invention.

FIG. 3 is an illustration of the relationship between the pointer storage section and the execution section in the address space. Part 301 exists in the shaded part as the part corresponding to the execution section. This part 301 corresponds to the execution section and stores, for example, instruction for executing a function. Part 302 corresponds to the pointer storage section and stores, for example, the first address of the shaded part 301.

FIG. 4 is an illustration of the pointer storage section and the execution section expressed by programming language. In FIG. 4, C language is used as a programming language.

Part (a) defines the variable "fp" as a pointer variable of a global variable storing pointer. This variable "fp" corresponds to the pointer storage section.

Part (b) defines the function "f". This function corresponds to the execution section.

Part (c) defines the function "main". In C language, the function named "main" is a specific one and corresponds to the first function to be called at the point of execution of the program.

Part (d) performs substitution so that the pointer variable "fp" specifies the function "f".

This substitution corresponds to that the first address of the shaded part 301 is stored in the part 302 in cases where, in FIG. 3, the shaded part 301 corresponds to the function "f" and the part 302 corresponds to the variable "fp".

Note that the pointer storage section 101 may store multiple pointers.

Figure 6:
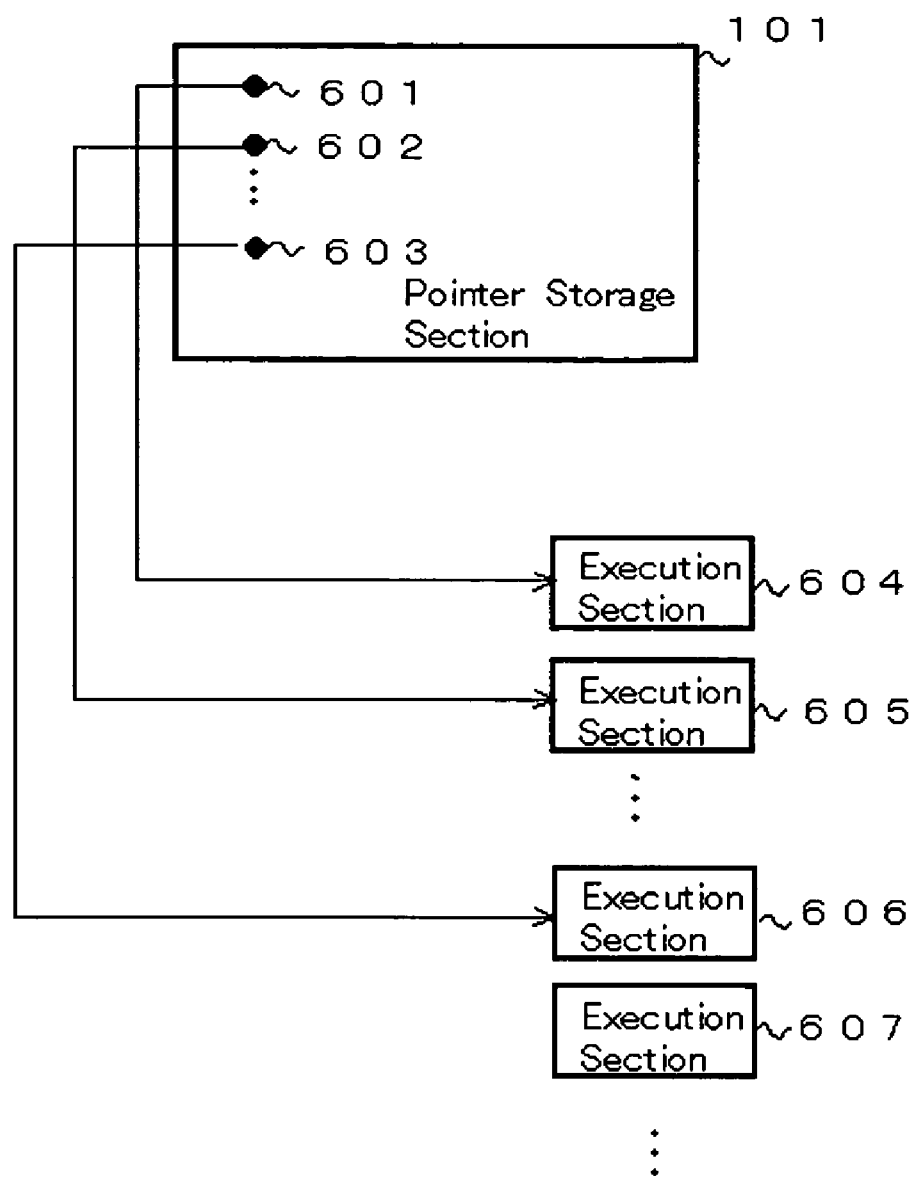
FIG. 6 is an illustration of the present invention in the case where multiple pointers exist.

FIG. 6 is an illustration of the pointer storage section 101 storing multiple pointers 601, 602, . . . , 603. Each pointer specifies the execution section 604, 605, . . . , 606. Moreover, as shown in FIG. 6, the execution sections 607, . . . , which are not indicated by pointer, may exist. In programming language, these multiple pointers are expressed by multiple variables or by array.

Moreover, pointer stored in the pointer storage section may be stored in the list structure.

Figure 7:
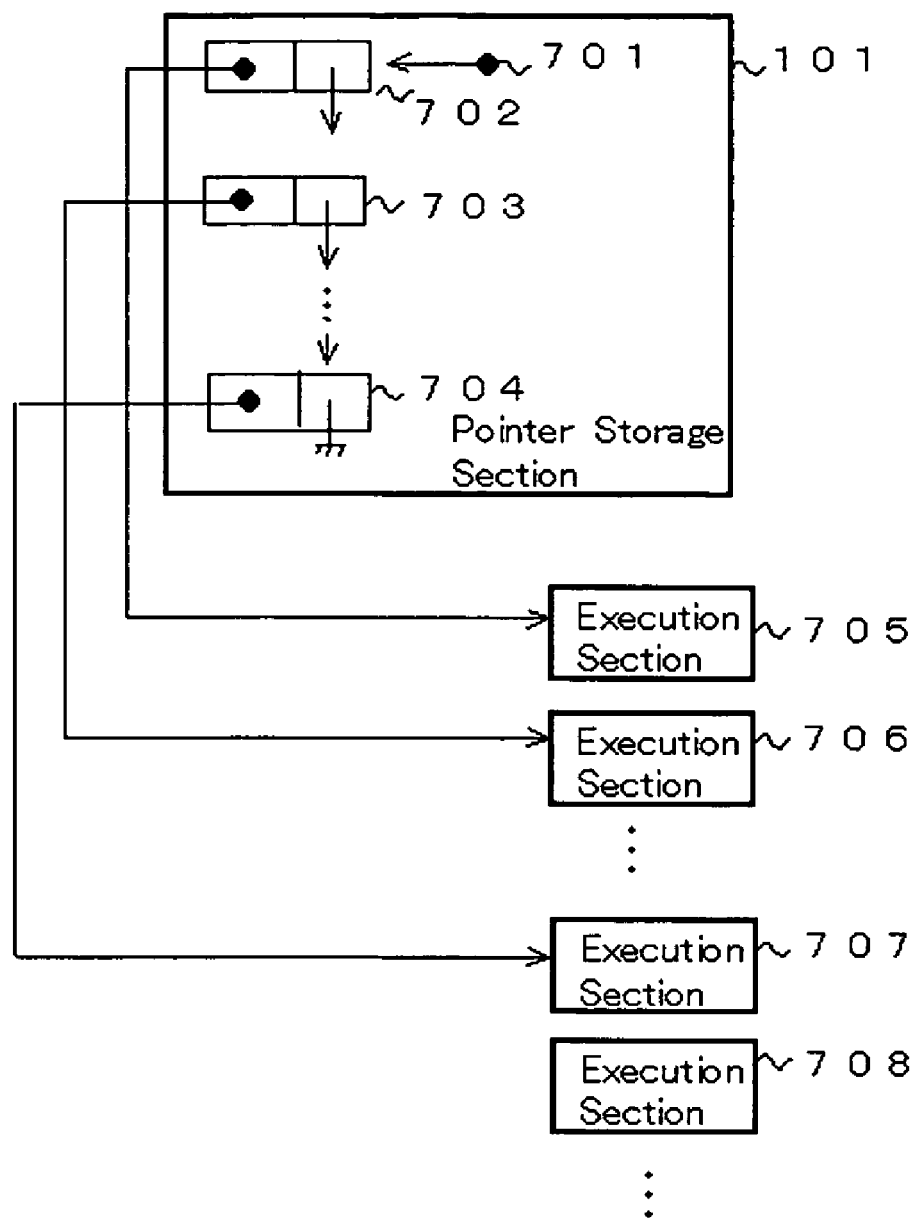
FIG. 7 is an illustration of the present invention in the case where the pointer is stored in the list structure.

FIG. 7 is an illustration of pointer stored in the list structure. It is able to track all the list cells by tracking pointers from the pointer of the list cell 702, specified by the pointer 701 specifying the list cell 702 which is the head of the list structure, to the pointer of the other list cell.

Specifically, since no cell exists subsequent to the last cell 704 of the list structure, the pointer of the last cell 704 stores the special value indicating that no subsequent cell exists. For example, in programming language, "NULL" is used as this special value.

FIG. 8 is an illustration of the definition, in programming language, of the data structure of the list cell for constructing the list structure of FIG. 7. The "fp" defined in part (a) is a pointer specifying an execution section, and the "next" defined in part (b) is a pointer specifying the subsequent cell.

The "pointer management section" 102 changes the pointer stored in the pointer storage section 101 according to the predetermined change condition. "Change according to the predetermined change condition" corresponds to changing in cases where the predetermined condition is fulfilled. For example, in cases where the specific button equipped with the computing apparatus 100 is pressed, in cases where the specific key on the keyboard is pressed, in cases where the specific string is inputted by the keyboard, or in cases where data is received by the reception section equipped with the computing apparatus 100, the pointer is changed.

Note that "pointer is changed" corresponds to that the pointer, which has already existed, specifies the other execution section.

Figure 5:
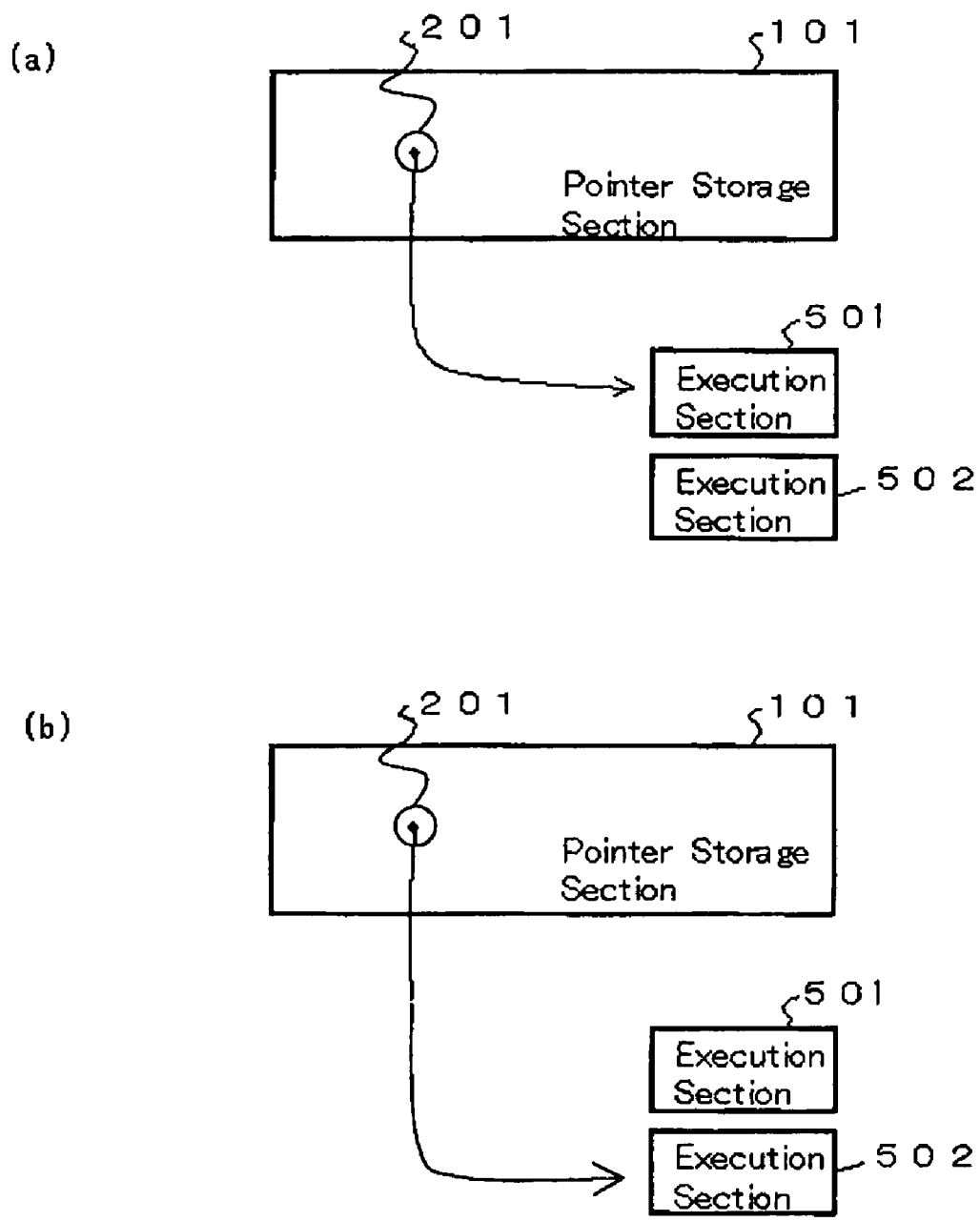
FIG. 5 is an illustration of the change of pointer by the pointer management section of the present invention.

FIG. 5 is an illustration of change of pointer. In (a), the pointer 201 stored in the pointer storage section 101 specifies the execution section 501. In cases where the predetermined condition is fulfilled, as illustrated in (b), the pointer 201 specifies the execution section 502.

In programming language, it is expressed that the pointer management section determines whether or not the predetermined condition is fulfilled, and if so, the value is substituted in the pointer variable.

The "data storage section" 103 is a section capable of storing the data, used for said execution, without changing even if said pointer has been changed. "Said pointer has been changed" corresponds to the case in which the pointer is changed by the pointer management section 102. "Said execution" corresponds to that the execution section, specified by the pointer stored by the pointer storage section 101, executes computation. "Capable of storing the data without changing" corresponds to the case where data stored in the data storage section 103 is not changed, even if said pointer has been changed. "Change" corresponds not only to a change of data itself but also to the case where the data is unavailable, such as deletion of the data etc.

Therefore, although the data storage section 103 stores data, the data is stored in a different area from the pointer stored in the pointer storage section. Moreover, in cases where the computing apparatus 100 is implemented by the computer using program, the execution of the program is not halted even if the pointer has been changed.

The "execution instruction section" 104 is a section for causing the execution section, specified by the pointer stored in the pointer storage section 101, to execute computation by using data stored in the data storage section 103 according to the predetermined execution condition.

"According to the predetermined execution condition" corresponds to the case where the predetermined condition is fulfilled. Examples of the cases where the predetermined condition is fulfilled include:

the case where it is detected that the specific switch is pressed, the case where the specific string is inputted by keyboard, the case where the specific data is received under the condition that the computing apparatus 100 receives data from outside the apparatus, the case where data becomes transmittable under condition that the computing apparatus 100 transmits data from outside the apparatus, and the case where the predetermined time has passed from a certain point.

Note that the term "predetermined" in the definition of the pointer management section 102 may be different from the term "predetermined" in the definition of the execution instruction section.

FIG. 9 is an illustration of the execution instruction section 104 expressed by programming language. In (a), the pointer variable "p" for specifying the data stored in the data storage section 103 is defined. In (b), value 0x37468AB8 is substituted with the pointer variable "p" for the data. In (c), since the predetermined execution condition has been fulfilled, the function specified by the pointer "fp" is called. At this point, the pointer variable "p" for the data is given as an argument. Thereby the function specified by the pointer "fp" is called and stored in the data storage section 103, so that computation is executed by using the data specified by the value 0x37468AB8. Note that in FIG. 9, although only one data is passed to the function specified by the pointer "fp", multiple data may be passed.

Hereinabove, the computing apparatus 100 and the computing program, a program for implementing the computing apparatus 100, have been described by using programming language. Moreover, the computing program of the present invention will be re-described hereinafter.

The computing program of the present invention is the program for causing the computer to execute the pointer storage step, the pointer management step, the data storage step, and the execution instruction step.

The "pointer storage step" corresponds to a step of storing a pointer for specifying the execution section executing computation. For example, in cases where the variable "fp" is defined in programming language as shown in FIG. 4, the step reserves area for the variable "fp" corresponding to the pointer at the point of activating a program. Moreover, in cases where the pointer is stored in the list cell as illustrated in FIG. 7, the step reserves memory area for the list cell.

The "pointer management step" corresponds to a step changing the pointer stored by the pointer storage step according to the predetermined change condition. For example, in cases where the predetermined change condition is fulfilled, the step performs substitution with the variable corresponding to the pointer.

The "data storage step" is a step capable of storing the data, used for said execution, without changing even if said pointer has been changed. "Said pointer has been changed" corresponds to the change of the pointer by the pointer management step. "Said execution" corresponds to the execution of computation by the execution section specified by the pointer stored by the pointer storage step. "Capable of storing without changing" corresponds to that the data stored by the data storage step is not changed even if the pointer has been changed by the pointer management step. Therefore, the area into which the pointer stored by the pointer storage step and the area into which the data stored by the data storage step are separated.

The "execution instruction step" corresponds to a step of causing the execution section, specified by the pointer stored by the pointer storage step, to execute computation by using the data stored by the data storage step according to the predetermined execution condition.

Moreover, the present invention provides the computing apparatus and the computing means used by the computing program.

The computing means comprises the pointer storage step, the pointer management step, the data storage step, and the execution instruction step.

The "pointer storage step" corresponds to a step of storing pointer for instructing the execution section for executing computation. For example, it is the step of executing the pointer storage section 101.

The "pointer management step" corresponds to a step of changing the pointer stored by the pointer storage step according to the predetermined change condition. For example, it is the step of executing the pointer management section 102.

The "data storage step" is a step capable of storing the data used for said execution without changing even if said pointer has been changed. For example, it is the step of executing the data storage section 103. Here, "said pointer has been changed" corresponds to the change of the pointer by the pointer management step. "Said execution" corresponds to the execution of computation by the execution section specified by the pointer stored by the pointer storage step. "Capable of storing data without changing" corresponds to that the data stored by the data storage step is not changed even if the pointer has been changed by the pointer management step.

The "execution instruction step" corresponds to a step of causing the execution section, specified by the pointer stored by the pointer storage step, to execute computation by using the data stored by the data storage step according to the predetermined execution condition. For example, it is the step of executing the execution instruction section 104.

According to the computing apparatus, the computing program, and the computing means described in the first embodiment, it becomes possible to change the execution section, executed according to the predetermined execution condition, according to the predetermined change condition, thereby enabling to change the execution section dynamically.

In the second embodiment of the present invention, the computing apparatus, the computing program, and the computing means have the function of executing addition and deletion of a pointer according to a predetermined condition.

In the computing apparatus of the present embodiment, the pointer management section 102 of the computing apparatus 100 of the first embodiment has a function of adding and deleting a pointer according to a predetermined condition.

The computing program of the present embodiment is a program for causing computer to execute addition and deletion of pointer according to the predetermined condition in the pointer management step of the computing program of the first embodiment.

FIG. 10 is an illustration of adding pointer. FIG. 10(a) illustrates that the pointer stored by the pointer storage section 101 is stored in the list structure as shown in FIG. 7. In the case where pointer is stored in the list structure, as shown in (b), new list cell 1009 is reserved, the pointer 1010 thereof specifies the execution section 1008, the pointer 1001 specifying the list structure specifies the list cell 1009, and specifies the list cell 1002 from the list cell 1009.

FIG. 11 is an illustration of operation for acquiring the state of FIG. 10(b) from the state FIG. 10(a) expressed by programming language.

In (a), the variable "pl" specifying the list cell newly added is declared. In (b), function "malloc" is called and the result therefrom is substituted to the variable "pl" in order to reserve memory area for the newly added list cell. Note that "sizeof*pl" indicates number of bites used by the memory area for the newly added list cell. In (c), a substitution is performed so that the pointer of the reserved list cell indicates the function "g", and the head of the list cell in the current list structure is pointed from the reserved list cell. "Pointerlistbase" is a variable and corresponds to the pointer 1001 specifying the list structure. By substituting the value of the variable "Pl" to "pointerlistbase", the state of FIG. 10(b) is acquired. Note that, although in FIG. 10(b) and FIG. 11, the newly added list cell becomes the first list cell in the list structure, it is easy to add the new list cell to be added to an arbitrary position.

Moreover, in cases where pointer is stored in the list structure, it is possible to delete the pointer.

FIG. 12 is an illustration of an operation of deleting pointer expressed by programming language. In (a), the variable "pl" is declared. In (b), the value of "pointerlistbase" corresponding to the pointer 1001 is substituted to "pl" in order to cause "pl" to specify the first list cell in the list structure, and to cause "pointerlistbase" to change to specify the subsequent list of the first list cell in the list structure. In (c), the memory area used by the list cell specified by the "pl" is deleted by calling the function "free".

FIG. 13 is an illustration of the instruction execution section, using the above-mentioned list structure, expressed by programming language. For example, in cases where the execution section, specified by the pointer of the third list cell from the head of the list structure, is executed:

in (c), the value of "pointerlistbase" is substituted to the variable "pl" so that "pl" specifies the first list cell in the list structure.

in (d), "pl" is moved three times along the list structure,

"for(n=0;n<3;n++)" indicates repetitive operation of executing "pl=pl->next", n=0 indicates that 0 is substituted to n before the repetitive operation, n<3 indicates condition to be fulfilled for the repetitive operation, and n++ indicates that one repetitive operation increases, by 1, the value substituted to n, in (e), the function specified by the pointer stored in the list cell specified by the variable "pl" and the value substituted to the variable "p" is passed at that point.

Note that, although the list structure is used as the data structure in the above description, it is not limited to the list structure. For example, the pointer storage section may be implemented by using large array, hash structure or tree structure.

In cases where the pointer management section adds pointer, the execution section executed by the execution instruction section increases, thereby increasing function provided by the computing apparatus and the computing program. Moreover, in cases where the pointer management section deletes pointer, the execution section executed by the execution instruction section decreases, thereby enabling the computer apparatus and the computer program to stop providing unnecessary functions.

In the third embodiment of the present invention, the computing apparatus re-reading the execution section, the computing program, and the computing means are provided.

Figure 16:
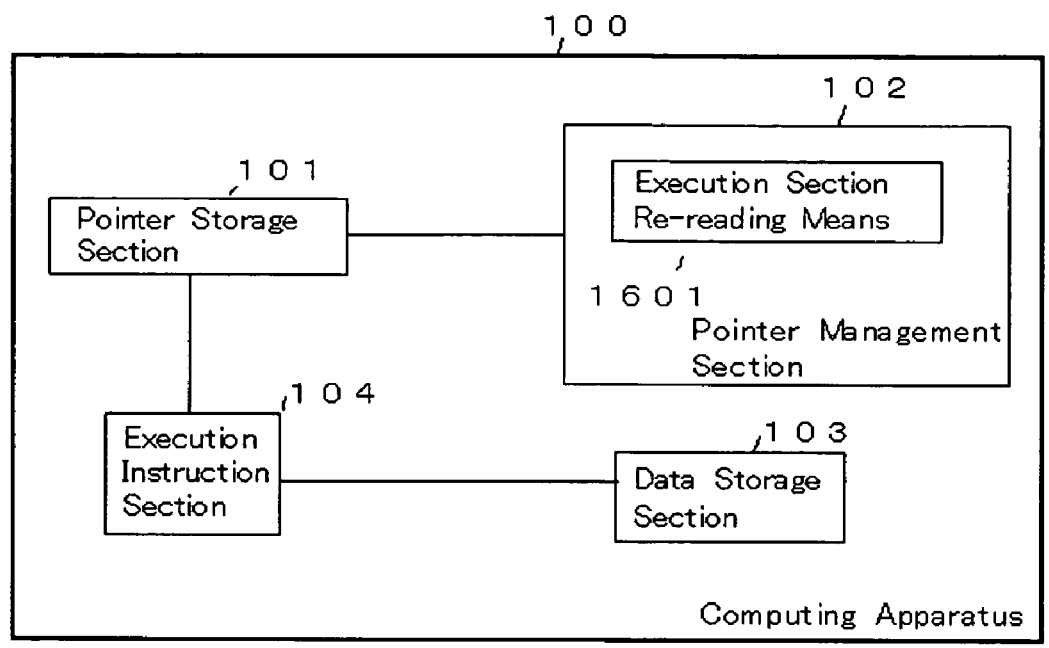
FIG. 16 is a functional block diagram of the computing apparatus of the present invention.

FIG. 16 is a functional block diagram of the computing apparatus of the present invention. In FIG. 16, the pointer management 102 of the computing apparatus 100 of the first embodiment comprises the execution section re-reading means 1601.

The "execution section re-reading means" 1601 re-read the execution section. The re-reading of the execution section may be operated at the start of the computing apparatus 100 or while the computing apparatus 100 operates.

In cases where the computing apparatus 100 is implemented by the computer using the computing program, the function corresponding to the execution section re-reading means 1601 is implemented, for example, by reserving memory area from the heap area and re-reading data including instruction implementing functions and procedures to the reserved memory area.

Note that "re-reading" shall not be limited to reading the same execution section. For example, an execution section different from the current execution section may be read by fixing bugs or speeding up processing.

In the present embodiment, the pointer management section changes said pointer so as to specify the execution section re-read by the execution section re-reading means 1601. "Said pointer" corresponds to the pointer stored by the pointer storage section 101. Note that either all the pointers or some of the pointers stored by the pointer storage section 101 may be changed.

In cases where the computing apparatus 100 is implemented by computer using computing program, such function of the pointer management section is implemented by substituting the first address of instruction, implementing function and procedure of memory area into which the data including instruction is read, to pointer. For the purpose of this, the symbol table indicating the correspondence of the name of function included in data to the address is read.

Note that, the case exists where the execution section unspecified by any pointer, when the execution section is read by the execution section re-reading means, and the pointer specifies the re-read execution section. In this case, such execution section may be deleted.

In cases where the computing apparatus 100 is implemented by the computer using computing program, the memory area for the execution section unspecified by any pointer may be collected, and reused at the next point of reading the execution section.

Note that the execution section re-reading means may re-read the data conversion execution section.

Here, "data conversion execution section" is a section for converting data stored by the data storage section 101. "Data conversion" corresponds to conversion of data format. For example, data, which has been expressed by a hash, is converted to data which is expressed by B-tree. Data expressed by the simplex list becomes possible to be expressed by the duplex list. Moreover, in cases where data format is defined by structure of C language, the order of members of the structure may be replaced, deleted, or added to. Furthermore, conversion of format of member is included. (e.g. a value of "chanr" format is converted to "long" format.)

There exist the following additions of members of structure. Therefore, it is assumed that the current structure is defined with the following formula.

| Formula 2: | struct oldstruct{<br>    int ver;<br>    struct sockaddr src;<br>    struct sockaddr dst;<br>}; |
|---|---|

The definition of new structure to which a member "time" is added becomes as the following formula.

| Formula 3: | struct newstruct{<br>    int ver;<br>    struct sockaddr src;<br>    struct sockaddr dst;<br>    time_t time;<br>}; |
|---|---|

In this case, the data conversion execution section which is read by the execution section re-reading means, for example, reserves memory area of the data of "newstruct", substitutes the values of "ver", "src", and "dst" of "oldstruct" to the values of "ver", "src", and "dst" of "newstruct" in order to keep the values of "ver", "src" (in cases where "ver" is a member indicating number of conversion of data structure, 1 is added to the value of "ver"), and "dst" of "oldstruct", and appropriately generates the value of "time". Moreover, the data of "newstruct" is placed to the area wherein the data of "oldstruct" has existed, or the value of the pointer variable specifying "oldstruct" is changed so as to specify "newstruct". After that, the memory area of "oldstruct" is deleted.

Note that, an object of the data conversion by the data conversion execution section is, for example, to enable the data of the data structure, processable for the former execution section, to be processable for the execution section which is re-read, in cases where the data structure, processable for the execution section re-read by the execution section re-reading means, is different from the data structure processable for the former execution section.

Therefore, in this case, the data conversion section is required to convert data before the execution of computing by the execution section. Examples of data conversion for that purpose include:

when the data conversion execution section is read, the data conversion execution section executes data conversion, when pointer is changed by the pointer management section 102, the data conversion execution section executes data conversion, or when the execution section, the start of computing of which has been set to be detected in advance, starts computing, the data conversion execution section executes data conversion.

Note that it is possible to make the data conversion concurrent with the re-reading by the execution section unnecessary. For this purpose, for example, the first member "ver" of the data structure, as shown in Formula 2 or 3, indicates a version of data. Therefore, said data may include version information. Note that "said data" corresponds to the data stored by the data storage section 101. Moreover, "version information" corresponds to information indicating data structure. Therefore, data structure is specified by version information. Examples of version information include integer, fixed-point value, floating-point value and string, are data used for determination of equality. Moreover, in cases where class has a method of determination of equality such as C++ language, the class indicating version may be used. In the above formula 2 and 3, since version information is stored in the integer member "ver", version information is indicated by integer.

In cases where data includes version information, the execution section re-read by the execution section re-reading means 1601 may execute computing according to the version information of the data. The execution section detects version information included in data and executes computing according to the version information. In programming language (specifically in C language), data is cast to the specific structure including member storing version information, and the value of member corresponding to the version information included in the data is acquired. Next, the value of the member is referred in "if" statement or "switch" statement, and proper computation is selected and executed.

Moreover, in cases where the re-read execution section generates data, the data may include the version information indicating the data structure thereof and may be stored by the data storage section 101.

Thereby data conversion concurrent with re-reading of the execution section becomes unnecessary.

According to the present embodiment, the execution section, fixed the bug thereof and speeded-up, is re-read during execution of the computing apparatus, thereby enabling version-upgrade of the execution section without halting the computing apparatus.

In the fourth embodiment of the present invention, the computing apparatus, the computing program, and the computing method for adding the execution section are provided.

Figure 17:
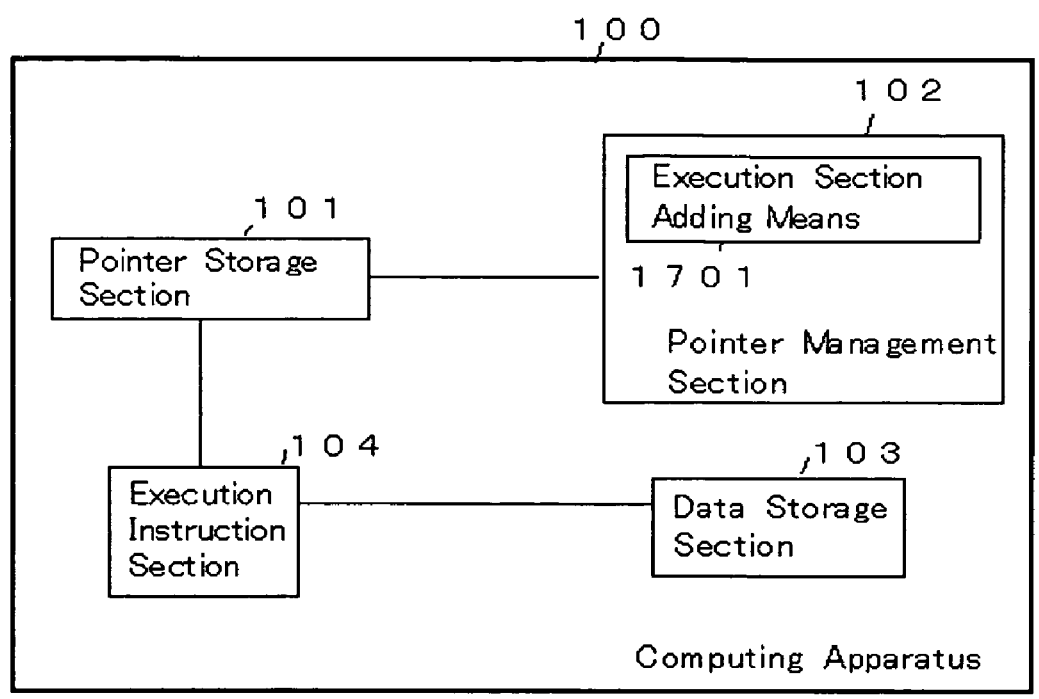
FIG. 17 is a functional block diagram of the computing apparatus of the present invention.
Figure 1:
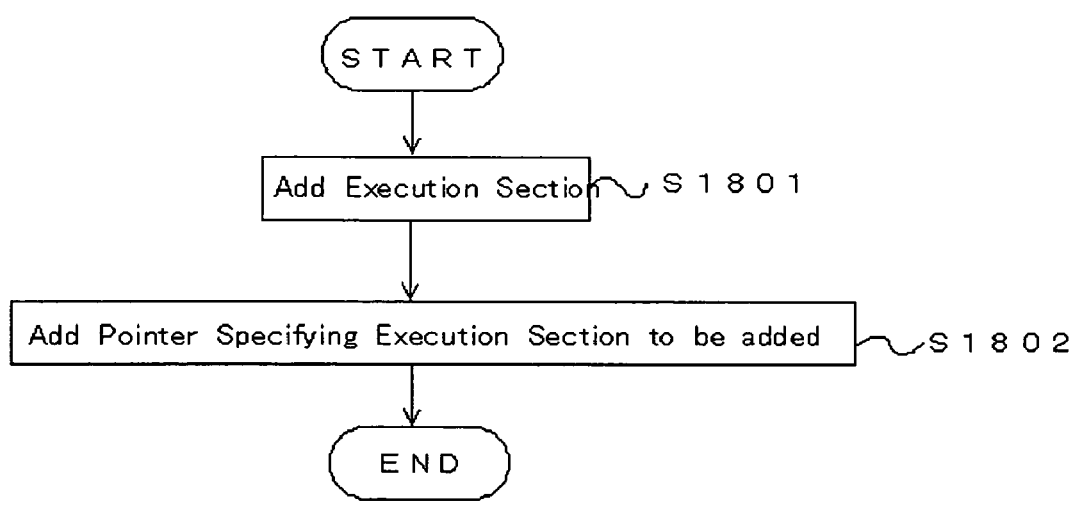

FIG. 17 is a functional block diagram of the computing apparatus of the present embodiment. In the computing apparatus of the present embodiment, the pointer management section of the computing apparatus of the second embodiment comprises the execution section adding means 1701.

The "execution section adding means" 1701 adds the execution section. Addition of the execution section is implemented, for example, by reserving memory area from the heap area and reading data including instruction implementing functions and procedures in the reserved memory area, in cases where the computing apparatus is implemented by computer using program such as the re-reading of the execution section in the third embodiment of the present invention.

In the present embodiment, the pointer management section 102 adds the pointer specifying the execution section added by the execution section adding means 1701 to the pointer storage section 101. This addition of pointer can be implemented, for example, by the operation expressed by the programming language shown in FIG. 11.

FIG. 18 is a flow chart demonstrating the process specific to the computing apparatus of the present embodiment. In step S1801, the execution section is added by the execution section adding means 1701. In step S1802, the pointer, specifying the execution section added by the pointer management section 102, is added to the pointer storage section 101.

According to the present embodiment, the execution section is added, thereby enabling addition of the execution section having new functions without halting the computing apparatus and the computing program and provision of new function thereof.

In the fifth embodiment of the present invention, the computing apparatus, the computing program, and the computing method for deleting the execution section are provided.

Figure 19:
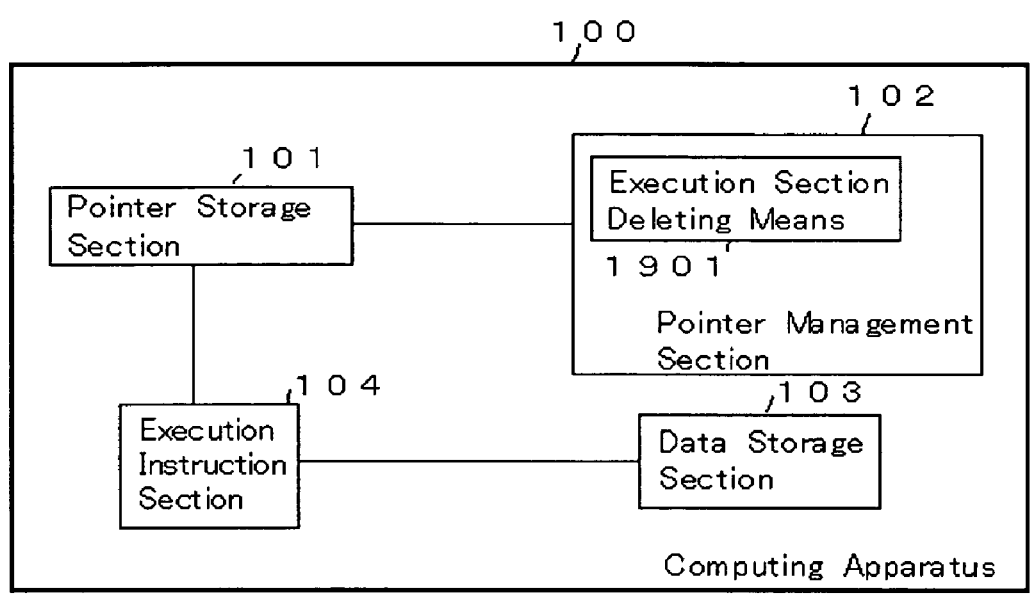
FIG. 19 is a functional block diagram of the computing apparatus of the present invention.
Figure 2:
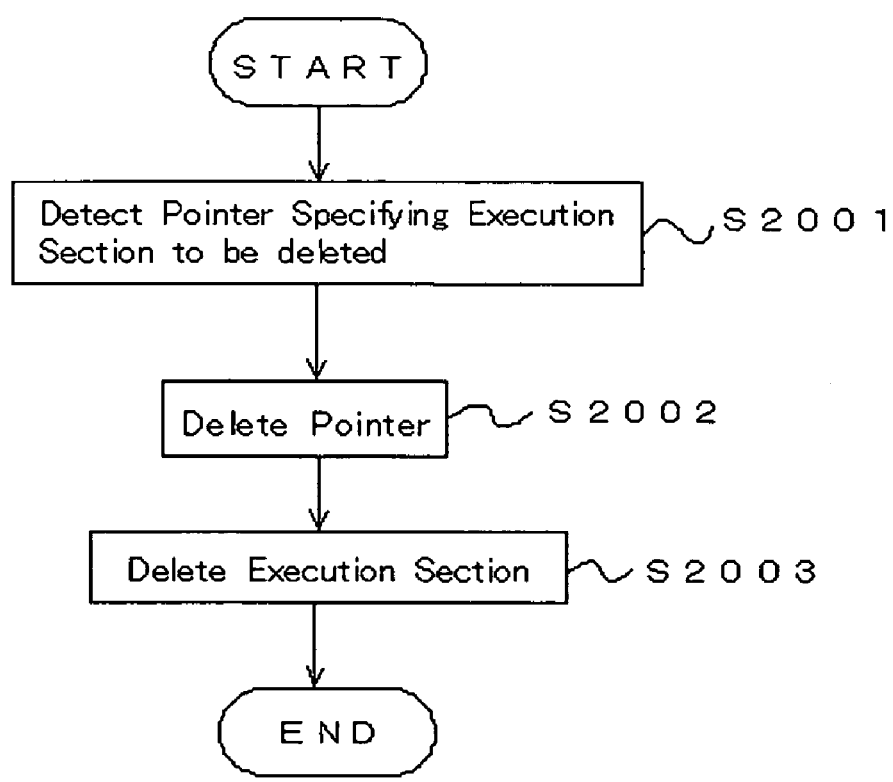
Figure 2:
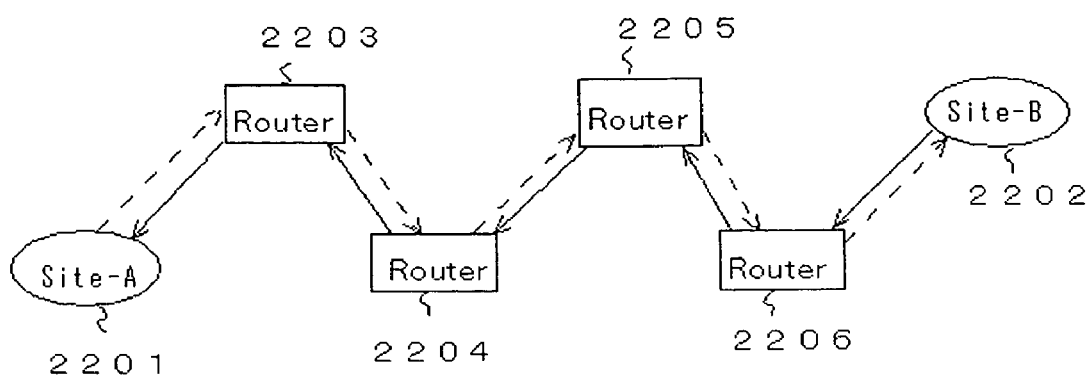
Figure 2:
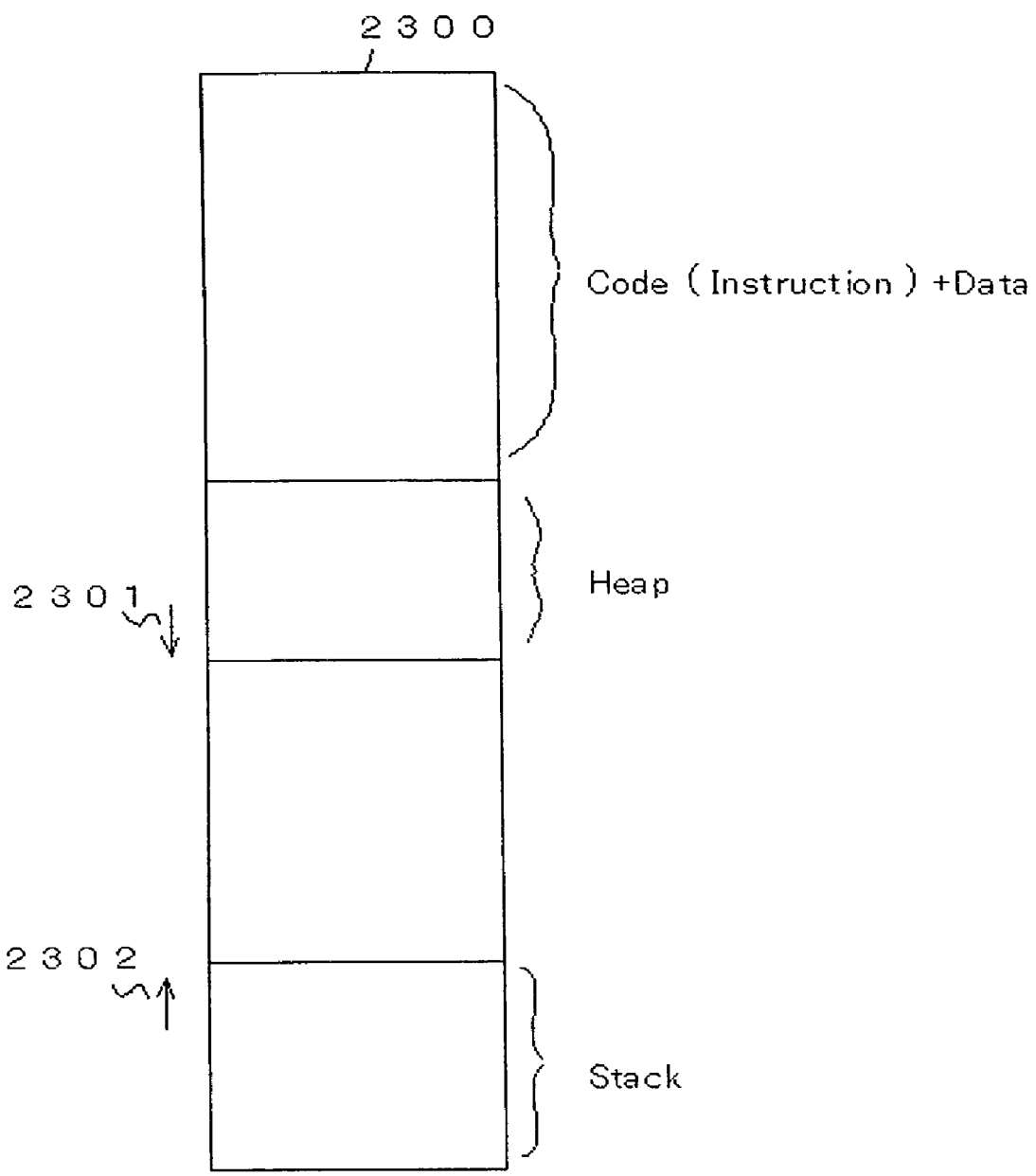

FIG. 19 is a functional block diagram of the computing apparatus of the present embodiment. In the computing apparatus of the present embodiment, the pointer management section of the computing apparatus of the second embodiment comprises the execution section deleting means 1901.

The "execution section deleting means" 1901 deletes the execution section. Deletion of the execution section corresponds to recovering memory area of address space wherein the execution section is placed and to making it reusable.

In the present embodiment, the pointer management section 102 deletes or changes the pointer specifying the execution section deleted by the execution section deleting means 1901. For example, in cases where the address of the execution section to be deleted is "0×284729EC", the pointer management section 102 tracks the list structure as shown in FIG. 21, detects the list cell including the pointer specifying "0×284729EC", and deletes the list cell. Moreover it may cause the pointer of the list cell to specify the other execution section or may substitutes the special value "NULL".

FIG. 20 is a flow chart demonstrating the process specific to the computing apparatus 100 of the present embodiment. In step S2001, the pointer, specifying the execution section to be deleted, is searched for. In step S2002, the pointer is deleted or changed. In step S2003, the execution section is deleted.

According to the present embodiment, the execution section is deleted, thereby enabling deletion of functions without halting the computing apparatus or the computing program.

Hereinafter, the router as a further aspect of the computing apparatus, the computing program and the computing method of the embodiments 1 to 5 will be described.

The router normally comprises plurality of network interfaces. In cases where packets are received by the one network interface, the network interface transmitting the packet is selected according to the route information stored as data and transmits the packet.

Moreover, the router receives the route information transmitted from the other router and re-computes the route information stored as the data. Moreover, the router transmits the route information stored as the data therein to the other router. Furthermore, by a timer detecting a lapse of a certain length of time, it is detected that re-computing of route is to be executed, the adjacent router is down, or reception or transmission of control information other than the route information.

The router detects these occurrences such as the reception of packet or the lapse of a certain length of time by a timer etc. as the "event". In cases where the event is detected, a function corresponded to the event is called. This function is called the "event handler".

Moreover, the instructions for setting router etc. are executed by keyboard connected to router etc., and processed by the event handler.

Therefore, the event handler is specified as the execution section by the pointer and these pointers are stored, thereby acquiring the pointer storage section.

Moreover, the pointer management section is acquired as the section changing this pointer according to the predetermined condition, the data storage section is acquired as the section storing the stored route information etc., and the execution instruction section is called as the section calling the event handler corresponding to the event conditional upon the case of acquisition of the event.

Figure 14:
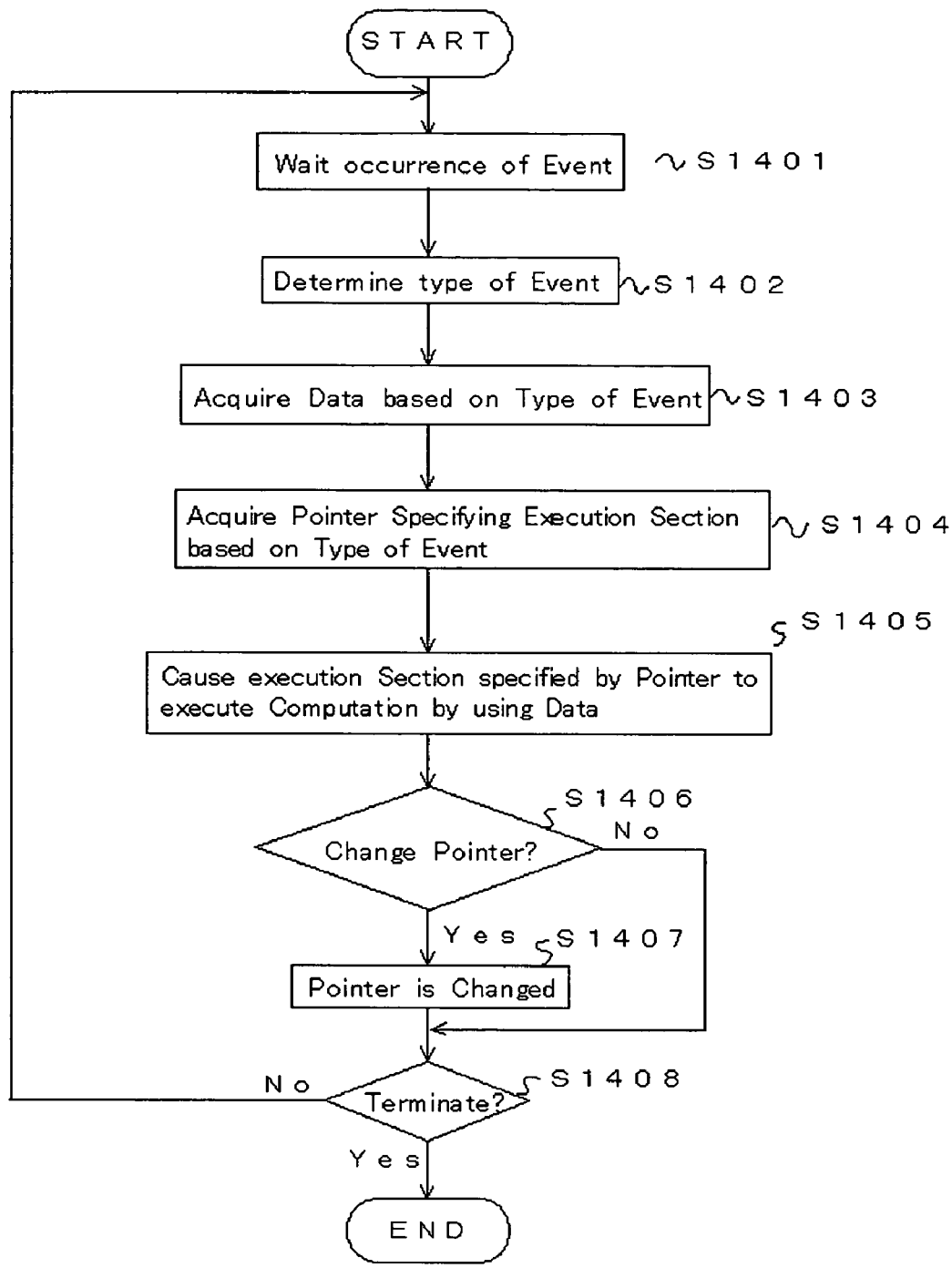
FIG. 14 is a flow chart of a process of the present invention.
Figure 1:
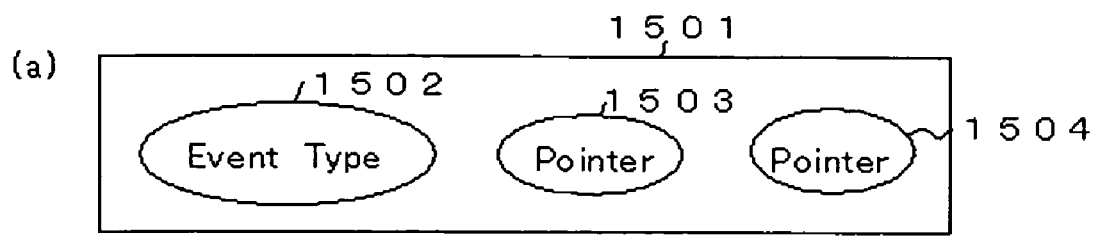

FIG. 14 is a flow chart demonstrating an operation of the router.

In step S1401, occurrence of the event is awaited. For example, by executing "select" system-call, the packet reception is awaited, the packet becomes transmittable, or a certain length of time elapses etc.

In step S1402, type of event is determined. For example, by detecting the result of "select" system-call, it is determined whether or not the packet has been received, whether or not the packet has become transmittable, or whether or not a certain length of time has elapsed etc.

In step S1403, the data is acquired based on type of the event. For example, in cases where the packet is received, route information is acquired.

In step S1404, the pointer specifying the execution section based on the type of the event.

In step S1405, the execution section executes computation specified by the pointer by using the data. For example, in cases where the control packet is received, the event handler corresponded to the event of reception of the control packet is called.

In step S1406, it is determined whether or not change of the pointer is to be executed. Here, "change of the pointer" may include addition or deletion of the pointer of the second embodiment. In cases that it is determined that the pointer is to be changed, the process proceeds to step S1407, and the pointer is changed. If not, step S1407 is skipped.

In step S1408, it is determined whether or not the process of the router is to be terminated. If not, the process returns to step S1401.

Note that in step S1403 and S1404, the data and the pointer corresponded to the event are required to be acquired, which becomes possible by the data structure 1501 as shown in FIG. 15(a). The data structure 1501 comprises the event type 1502, the pointer 1503, and the data 1504. The event type 1502 indicates the type of event, the pointer 1503 specifies the event handler corresponding to the event, and the data 1504 is a data to be passed to the event handler. For example, by storing this data structure 1501 in the hash structure, the key of which is event type, it becomes possible to acquire the data structure corresponding to the event type from the event type thereof at high-speed.

For example, in cases where it is detected that one event handler has a bug, the router re-reads the event handler which has no bug, the pointer specifying the event handler which has a bug is changed so as to specify the event handler which has been re-read.

Thereby it becomes possible to update the event handler to an event handler with a fixed bug, without halting the router. Moreover, in cases where a new function is added to the event handler, the event handler having the new function is re-read, thereby enabling addition of function without halting the router. Since it is not required to halt the router, it becomes possible to update or add the event handler with storing value of variable, content of database, opened file, state of communication or socket as they are.

In cases where the event handler is re-read and the data format thereof is different from the data format of the former event handler, data conversion may be executed by reading the event handler and the data conversion execution section for converting data.

Moreover, in this case, by defining the re-reading of the event handler as the re-reading event, the function updating the data structure stored by the data storage unit may be used as the event handler corresponding to the re-reading event. Thereby it becomes possible to execute the update of data structure concurrent with the update of the event handler. For example, in cases where the data structure is defined by the structure of C language, the order of the member of the structure indicating the data processed by the event handler, and the member of structure is deleted or added, the conversion from the data of old structure to the data of new structure may be executed by the event handler corresponded to the re-reading event.

Moreover, in cases where the process for a new type of event is required, by re-reading the event handler to correspond to the event, it becomes possible to add the event handler without halting the router.

On the contrary, in cases where the event handler becomes unnecessary, it becomes possible to delete the event handler.

Hereinabove, the router has been described as a further aspect of the present invention. The present invention shall not be limited to the router, and may be applicable to the computing apparatus, the computing program and the computing method acquiring the event and calling the event handler corresponded to the event.

For example, in the program having graphical user interface, move of mouse, press of mouse button, press of key of keyboard, etc., are defined as the events and the event handler for processing each event is provided. Therefore, by specifying the execution section as the event handler by the pointer, it becomes possible to re-read, add, and delete the event handler without halting the program, thereby enabling a version-upgrade of the event.

According to the present invention, also in web server, it becomes possible to define the request from the client as the event and to cause the event handler to correspond to the event, so that it becomes possible to re-read, add, and delete the event handler without halting the web server, thereby enabling a version upgrade.

Note that although the execution section and the event handler have been identified and described hereinabove, the execution section is not limited to the event handler.

Thus, by specifying the execution section, which is the specific function, by pointer, is becomes possible to change or add the execution section without correlating the execution section with the event and halting the program.

As described hereinabove, according to the present invention, it becomes possible to change the execution section and to upgrade the computing apparatus and the computing program.

What is claimed is:

1. A computing apparatus connected to a network and functioning as a router, the computing apparatus comprising:
a pointer storage section capable of storing a pointer for specifying an execution section for execution of computation, the execution section including an event handler to be called when occurrence of a corresponding event is detected;

a data storage section capable of storing a plurality of data that include routing information in the network;

an execution instruction section formed by a computer program, which maintains a data-pointer for specifying at least one of the plurality of data stored in said data storage section, the data-pointer being maintained as a value of a data-pointer variable defined in the computer program, awaits occurrence of the corresponding event, and, when occurrence of the corresponding event is detected, calls the execution section specified by the pointer stored in said pointer storage section, giving the data-pointer variable to the execution section as an argument, thereby causing the execution section to execute computation related to the routing information by use of said at least one of the plurality of data as specified by the value of the data-pointer variable; and a pointer management section capable of changing the pointer stored in said pointer storage section from a first pointer to a second pointer, the first pointer specifying a first execution section and the second pointer specifying a second execution section, wherein said data storage section is capable of keeping the plurality of data stored, after the pointer is changed by said pointer management section, thereby enabling said execution instruction section to cause the second execution section to execute computation by use of at least one of the plurality of data that has been used by the first execution section, and enabling the event handler to be updated while keeping a state of communication or socket in the router.

2. The computing apparatus according to claim 1, wherein said pointer management section includes a function of deleting the pointer stored in said pointer storage section and a function of adding another pointer to said pointer storage section.

3. The computing apparatus according to claim 1, wherein said pointer management section includes a function of re-reading the execution section by reading the second execution section in place of the first execution section.

4. The computing apparatus according to claim 1, wherein said pointer management section further has a function of reading a data conversion execution section for converting data stored in the data storage section.

5. The computing apparatus according to claim 1, wherein said data storage section is capable of storing information of a version of the data, and said execution section is capable of executing computation by use of the data in accordance with the version indicated by the information.

6. The computing apparatus according to claim 1, wherein said pointer management section includes a function of adding another execution section, and a function of adding another pointer specifying said another execution section to said pointer storage section.

7. The computing apparatus according to claim 1, wherein said pointer management section includes a function of deleting the execution section, and a function of deleting or changing said pointer stored in said pointer storage section, said pointer specifying the execution section deleted.

8. The computing apparatus according to claim 1, wherein the data stored in said data storage section includes at least one of: data received from the network; data transmitted to the network; and data computed based on the data received and/or the data transmitted.

9. The computing apparatus according to claim 1, wherein the routing information is used in selecting a network interface for transmitting a packet received from the network.

10. The computing apparatus according to claim 1, wherein said pointer management section includes a function of reading the second execution section in place of the first execution section, the second execution section being free from one or more errors identified in the first execution section and/or including a function in addition to functions included in the first execution section.

11. A computer usable program stored on a computer readable medium for a computer connected to a network and functioning as a router, the computer usable program causing the computer to execute:

storing, in a pointer storage section, a pointer for specifying an execution section for execution of computation, the execution section including an event handler to be called when occurrence of a corresponding event is detected;

storing, in a data storage section, a plurality of data that include routing information in the network;

maintaining, in an execution instruction section formed by a computer program, a data-pointer for specifying at least one of the plurality of data stored in said data storage section, the data-pointer being maintained as a value of a data-pointer variable defined in the computer program;

awaiting, in the execution instruction section, occurrence of the corresponding event; calling, in the execution instruction section, when occurrence of the corresponding event is detected, the execution section specified by the pointer stored in said pointer storage section, giving the data-pointer variable to the execution section as an argument, such that the execution section executes computation related to the routing information by use of said at least one of the plurality of data as specified by the value of the data-pointer variable; and changing the pointer stored in said pointer storage section from a first pointer to a second pointer, the first pointer specifying a first execution section and the second pointer specifying a second execution section, wherein the plurality of data in said data storage section are kept stored, after the pointer is changed, thereby enabling the second execution section to execute computation by use of at least one of the plurality of data that has been used by the first execution section, and enabling the event handler to be updated while keeping a state of communication or socket in the router.

12. A computing method performed in a computer connected to a network and functioning as a router, the method comprising:

storing, in a pointer storage section, a pointer for specifying an execution section for execution of computation, the execution section including an event handler to be called when occurrence of a corresponding event is detected;

storing, in a data storage section, a plurality of data that include routing information in the network;

maintaining, in an execution instruction section formed by a computer program, a data-pointer for specifying at least one of the plurality of data stored in said data storage section, the data-pointer being maintained as a value of a data-pointer variable defined in the computer program;

awaiting, in the execution instruction section, occurrence of the corresponding event;

calling, in the execution instruction section, when occurrence of the corresponding event is detected, the execution section specified by the pointer stored in said pointer storage section, giving the data-pointer variable to the execution section as an argument, such that the execution section executes computation related to the routing information by use of said at least one of the plurality of data as specified by the value of the data-pointer variable; and changing the pointer stored in said pointer storage section from a first pointer to a second pointer, the first pointer specifying a first execution section and the second pointer specifying a second execution section, wherein the plurality of data in said data storage section are kept stored, after the pointer is changed, thereby enabling the second execution section to execute computation by use of at least one of the plurality of data that has been used by the first execution section, and enabling the event handler to be updated while keeping a state of communication or socket in the router.

* * * * *